United States Patent
Dujol et al.

(10) Patent No.: US 10,337,333 B2
(45) Date of Patent: Jul. 2, 2019

(54) TURBINE BLADE COMPRISING A CENTRAL COOLING DUCT AND TWO SIDE CAVITIES CONNECTED DOWNSTREAM FROM THE CENTRAL DUCT

(71) Applicant: SAFRAN AIRCRAFT ENGINES, Paris (FR)

(72) Inventors: Charlotte Marie Dujol, Saint-Mande (FR); Patrice Eneau, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 389 days.

(21) Appl. No.: 15/314,033

(22) PCT Filed: May 22, 2015

(86) PCT No.: PCT/FR2015/051373
§ 371 (c)(1),
(2) Date: Nov. 25, 2016

(87) PCT Pub. No.: WO2015/181482
PCT Pub. Date: Dec. 3, 2015

(65) Prior Publication Data
US 2017/0183970 A1 Jun. 29, 2017

(30) Foreign Application Priority Data
May 28, 2014 (FR) ...................................... 14 54865

(51) Int. Cl.
*F01D 5/18* (2006.01)
*B22C 9/10* (2006.01)
*F01D 5/14* (2006.01)

(52) U.S. Cl.
CPC .............. *F01D 5/187* (2013.01); *B22C 9/103* (2013.01); *F01D 5/147* (2013.01); *F01D 5/186* (2013.01);
(Continued)

(58) Field of Classification Search
CPC ....... Y02T 50/676; F01D 5/187; F01D 5/186; F01D 5/188; F01D 5/147; F05D 2220/30;
(Continued)

(56) References Cited

U.S. PATENT DOCUMENTS

| 3,373,970 A | 3/1968 | Brockmann |
| 4,252,501 A | 2/1981 | Peill |

(Continued)

FOREIGN PATENT DOCUMENTS

| EP | 1 065 343 A2 | 1/2001 |
| EP | 1 655 452 A2 | 5/2006 |

(Continued)

OTHER PUBLICATIONS

International Search Report dated Aug. 26, 2015 in PCT/FR2015/051373 filed May 22, 2015.
(Continued)

*Primary Examiner* — Charles G Freay
*Assistant Examiner* — Thomas Fink
(74) *Attorney, Agent, or Firm* — Oblon, McClelland, Maier & Neustadt, L.L.P.

(57) ABSTRACT

A turbine blade for a turbomachine, including a vane extending in a spanwise direction between a root and a tip, a first inner side cavity running along a pressure-side wall and a second inner side cavity running along a suction-side wall. The blade further includes at least one inner central duct configured to collect air intended to cool the vane. The central duct extends between the side cavities, being separated from the side cavities to be at least partially thermally (Continued)

isolated from the pressure-side wall and the suction-side wall. The side cavities communicate with each other in a junction region located downstream from the central duct, over a majority of a height of the central duct in the spanwise direction.

9 Claims, 2 Drawing Sheets

(52) U.S. Cl.
CPC .......... F01D 5/188 (2013.01); *F05D 2220/30* (2013.01); *F05D 2230/21* (2013.01); *F05D 2230/211* (2013.01); *F05D 2250/75* (2013.01); *F05D 2260/204* (2013.01); *F05D 2260/2212* (2013.01); *Y02T 50/676* (2013.01)

(58) Field of Classification Search
CPC ............. F05D 2220/32; F05D 2230/21; F05D 2230/211; F05D 2250/75; F05D 2260/204; F05D 2260/2214; B22C 9/103
See application file for complete search history.

(56) References Cited

U.S. PATENT DOCUMENTS

| | | | | |
|---|---|---|---|---|
| 4,473,336 A * | 9/1984 | Coney | ..................... | B23P 15/04 416/223 A |
| 4,484,859 A * | 11/1984 | Pask | ..................... | F01D 5/16 415/115 |
| 5,193,975 A * | 3/1993 | Bird | ..................... | F01D 5/186 415/115 |
| 5,203,873 A * | 4/1993 | Corsmeier | ..................... | F01D 5/147 416/96 A |
| 6,168,381 B1 | 1/2001 | Reddy | | |
| 6,193,465 B1 * | 2/2001 | Liotta | ..................... | B23P 15/04 29/889.722 |
| 6,283,708 B1 * | 9/2001 | Zelesky | ..................... | F01D 5/189 416/97 R |
| 6,318,963 B1 * | 11/2001 | Emery | ..................... | F01D 5/186 416/96 A |
| 6,514,046 B1 * | 2/2003 | Morrison | ..................... | F01D 5/187 416/229 A |
| 8,206,098 B2 * | 6/2012 | Prill | ..................... | F01D 5/284 415/200 |
| 8,210,803 B2 * | 7/2012 | Schaff | ..................... | F01D 5/147 415/200 |
| 8,292,580 B2 * | 10/2012 | Schiavo | ..................... | F01D 5/189 416/229 A |
| 10,107,119 B2 * | 10/2018 | Walston | ..................... | F01D 9/041 |
| 2002/0064452 A1 * | 5/2002 | Ciani | ..................... | F01D 5/186 415/115 |
| 2005/0089394 A1 * | 4/2005 | Lu | ..................... | F01D 5/186 415/115 |
| 2006/0096092 A1 | 5/2006 | Pietraszkiewicz et al. | | |
| 2006/0233644 A1 * | 10/2006 | Guimbard | ..................... | F01D 5/189 416/97 R |
| 2008/0044282 A1 | 2/2008 | Pietraszkiewicz et al. | | |
| 2008/0080979 A1 | 4/2008 | Brassfield et al. | | |
| 2008/0279697 A1 * | 11/2008 | Liang | ..................... | F01D 5/186 416/97 R |
| 2009/0285683 A1 | 11/2009 | Pietraszkiewicz et al. | | |
| 2010/0129194 A1 | 5/2010 | Propheter-Hinckley et al. | | |
| 2012/0207616 A1 | 8/2012 | Propheter-Hinckley et al. | | |
| 2012/0269647 A1 | 10/2012 | Vitt et al. | | |
| 2013/0251539 A1 * | 9/2013 | Gautschi | ..................... | F01D 5/187 416/97 R |
| 2014/0079540 A1 * | 3/2014 | Morris | ..................... | B22F 3/1055 415/178 |
| 2014/0083116 A1 * | 3/2014 | Crites | ..................... | F01D 5/187 60/806 |
| 2014/0348636 A1 * | 11/2014 | Buhler | ..................... | F01D 9/02 415/115 |
| 2015/0098835 A1 | 4/2015 | Propheter-Hinckley et al. | | |
| 2016/0186587 A1 * | 6/2016 | Hagan | ..................... | F01D 5/189 415/1 |
| 2017/0101893 A1 * | 4/2017 | Marsh | ..................... | F01D 5/08 |
| 2017/0107831 A1 * | 4/2017 | Itzel | ..................... | F01D 5/187 |
| 2017/0167269 A1 * | 6/2017 | Itzel | ..................... | F01D 5/187 |
| 2018/0223671 A1 * | 8/2018 | Marsh | ..................... | F01D 5/18 |
| 2018/0238176 A1 * | 8/2018 | Landrum | ..................... | F01D 5/188 |
| 2019/0024515 A1 * | 1/2019 | Marsh | ..................... | F01D 5/188 |

FOREIGN PATENT DOCUMENTS

| | | |
|---|---|---|
| EP | 2 119 873 A2 | 11/2009 |
| EP | 2 189 230 A1 | 5/2010 |
| JP | 61-279702 A | 12/1986 |

OTHER PUBLICATIONS

French Search Report dated Feb. 9, 2015 in FR 1454865 filed May 28, 2014.

* cited by examiner

TURBINE BLADE COMPRISING A CENTRAL COOLING DUCT AND TWO SIDE CAVITIES CONNECTED DOWNSTREAM FROM THE CENTRAL DUCT

TECHNICAL FIELD

The invention relates to a blade of a turbomachine type aircraft engine, such as for example a bypass turbojet engine or a bypass turboprop engine.

STATE OF PRIOR ART

In such an engine, outside air is inlet in an inlet duct to pass through a blower comprising a series of rotating vanes before being splitted into a central primary flow and a secondary flow surrounding the primary flow.

The primary flow is then compressed before coming into a combustion chamber, thereafter it is expended by passing through a set of turbines before being discharged rearward by generating thrust. As regards the secondary flow, it is propelled directly rearward by the blower to generate further thrust.

The expansion in turbines, which enables the compressor and the blower to be driven, occurs at a high temperature because it occurs immediately after the combustion. This turbine is thus designed and dimensioned to operate under harsh temperature, pressure and fluid flow rate conditions.

Each turbine includes a succession of stages each including a series of radially oriented blades evenly spaced about a rotating shaft of the engine. This central shaft carries the rotating elements of the turbine as well as the rotating elements of the compressor and blower.

Concretely, the turbine blades which are subjected to the harshest conditions are those of the first stages of expansion of this turbine, that is the closest stages to the combustion zone and which are commonly called high pressure stages.

Generally, the increased performance requirements and the changing regulations result in designing smaller size engines operating in increasingly harsh environments. This implies increasing the strength and performance of the high pressure turbine blades in particular as regards their temperature resistance.

However, existing improvements as regards materials and coatings of these blades are not sufficient for them to withstand the high temperatures that can be reached by the flow downstream from the combustion chamber. This situation leads to reconsider cooling of these blades to improve it such that they can withstand these new operating conditions.

This cooling is ensured by flowing inside these blades fresh air which is taken from turbojet engine upstream from the combustion. This air is inlet at the blade root, to travel along an inner circuit of the blade in order to cool it, and it is discharged from the blade by bores passing through the wall of this blade and distributed on this wall. These bores are used to discharge cooling air, but they also create at the outer surface of the blade, a cooler air film than the air from combustion, which also contributes to limit the blade temperature.

To increase the cooling efficiency, the internal regions of the blade wherein the cooling air flows include clever devices, that is inner relieves which disturb the smooth flow of the cooling air, to increase the heat transfer from the blade wall to this cooling air flowing in the inner ducts of the blade.

These cooling architectures are disadvantaged since the length of the inner circuit of the blade gives rise to a too strongly warmed air when it reaches the end of the circuit, such that its cooling efficiency is limited in the end of travel regions where it is on the contrary attempted to achieve an increased cooling efficiency.

The purpose of the invention is to provide a blade structure enabling the cooling efficiency of this blade to be improved.

DISCLOSURE OF THE INVENTION

The invention aims at solving at least partially the problems met in the solutions in prior art.

To that end, one object in the invention is to provide a turbine blade of a turbomachine such as a turboprop engine or a turbojet engine, the blade comprising:

a root, a vane carried by the root and extending in a spanwise direction ending with a tip, the vane comprising a leading edge and a trailing edge located downstream from the leading edge, the vane comprising a pressure-side wall and a suction-side wall spaced apart from each other and connecting the leading edge to the trailing edge, a first inner side cavity running along the pressure-side wall and a second inner side cavity running along the suction-side wall, supplied with air through at least one channel opening into the root, at least one inner central duct extending between the side cavities, by being separate from the side cavities and configured to collect at the root cooling air intended to flow in the vane to cool it. The side cavities communicate with each other, by merging in a junction region located downstream from the central duct and which extends over the majority of the height of the central duct in the spanwise direction.

Both side cavities preferably form with the junction region, a single cavity wrapping the central duct over the majority of the height of the central duct.

The inner configuration of the blade, through which the inner side cavities communicate with each other, by merging downstream from the central duct, allows a better heat insulation of the cooling air flowing in the central duct.

The invention can optionally include one or more of the following characteristics alone or in combination.

Advantageously, the junction region extends over the entire height of at least one of the first and the second side cavities in the spanwise direction.

The junction region preferably extends over the entire height of the central duct in the spanwise direction.

According to an embodiment feature, the junction region has, along at least one section plane orthogonal to the spanwise direction an upstream open U shape.

According to an advantageous embodiment, the U top has a thickness substantially constant along a longitudinal direction of extending the vane from the leading edge to the trailing edge.

According to another advantageous embodiment, the central duct, the first inner side cavity has smooth inner surfaces. The side cavities preferably comprise turbulence promoters and/or deflectors, for promoting air turbulence inside the blade and/or ensuring a more homogenous distribution of the cooling air.

According to another embodiment feature, the blade comprises several distinct inner side cavities running along the pressure-side and/or several distinct side cavities running along the suction-side. In this case, the junction region is preferably located in the downstream zone of the plurality of side cavities.

The invention also relates to a molding assembly for manufacturing a blade as defined above, comprising at least one footprint and a set of cores for forming the inner duct and side cavities.

The invention also relates to a turbomachine turbine comprising a blade as defined above.

Finally, the invention relates to a turbomachine comprising a turbine as defined above. The turbine is accordingly preferably a high pressure turbine in which the blades are subjected to higher temperature than in a turbomachine low pressure turbine.

BRIEF DESCRIPTION OF THE DRAWINGS

The present invention will be better understood upon reading the description of exemplary embodiments, given by way of indicating and in no say limiting purposes, in reference to the appended drawings in which.

DETAILED DISCLOSURE OF PARTICULAR EMBODIMENTS

Figure 1:
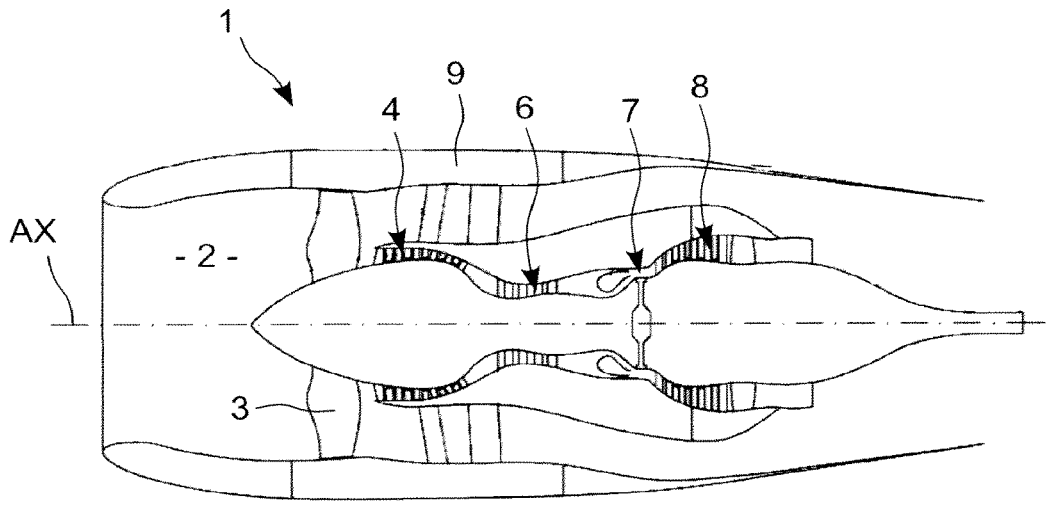
FIG. 1 is a schematic view of a bypass turbojet engine in a longitudinal cross-section view.

As can be seen in FIG. 1, a front part of a bypass turbojet engine 1 includes an inlet duct 2 in which air is inlet in before being sucked by the vanes of a blower 3. After passing through the region of the blower, the air is divided into a central primary flow and a secondary flow which surrounds the primary flow.

Then, the primary air flow passes through a first compressor 4 located immediately after the blower 3 whereas the secondary flow is propelled rearward to directly generate further thrust by being blown about the primary flow.

The primary flow then passes through a second compression stage 6, before reaching a chamber 7 where its combustion occurs, after injecting and vaporizing a fuel. After combustion, this primary flow is expanded in a high pressure turbine 8 and then in a low pressure turbine not represented to rotatably drive the compression stages and the blower, before being rearward expelled from the engine to generate thrust.

The turbomachine 1 and its components have a revolution shape about a longitudinal axis AX. It includes in particular an outer case 9 itself having a revolution shape and extending from the front of the engine where it delimits the air inlet duct, up to the rear part where it delimits the duct through which the primary and secondary flows are discharged, the front and rear being to be considered with respect to the direction of advance of the aircraft equipped with this turbojet engine. This case 9 supports the rotary components located in the center of the engine and which comprise a rotary shaft carrying the blower vanes as well as the compression stages and the turbine with their blades.

Figure 2:
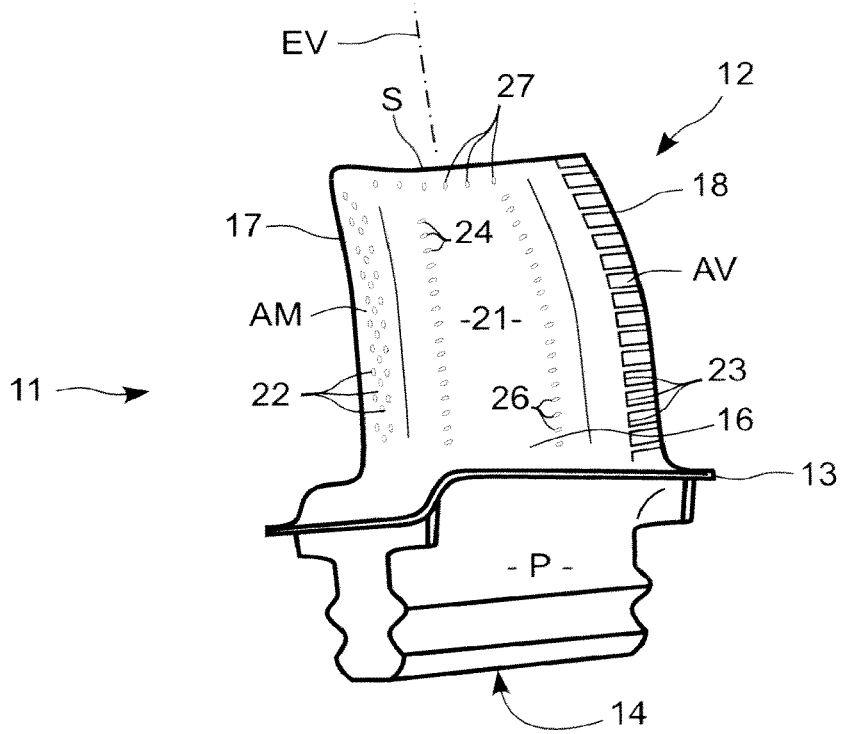
FIG. 2 is a perspective schematic view of a turbine blade according to a first embodiment of the turbojet engine shown in FIG. 1.
Figure 2:

Such a blade, which is denoted as 11 in FIG. 2, comprises a root P through which it is attached to a rotary body not represented, called a turbine disc, and a blade 12 carried by this root P and making the aerodynamic part of this blade. As can be seen in FIG. 2, the blade 11 includes between the root P and the vane 12 an intermediate region 13 called a platform.

The assembly formed by the root P and the blade 12 is a hollow integral single piece from foundry and including inner ducts through which cooling air flows. These inner ducts non visible in FIG. 2 include intake ports opening at the inner face 14 of the root P and through which these ducts are supplied with fresh air. The hollow wall of the blade 12 includes through holes and slits through which cooling air is discharged.

The blade 12 has a left twisted shape having a substantially rectangular contour, approaching a parallelepiped. It comprises a base 16 through which it is connected to the root P and which extends nearly parallel to the axis of rotation AX. It also includes a leading edge 17 radially oriented with respect to the axis AX and located at the upstream AM from the blade, that is the front region of this blade, with respect of the direction of advance of the engine equipped with it in use. This blade also includes a trailing edge 18 oriented nearly parallel to the leading edge 17 by being spaced apart from the same along the axis AX to be located at the downstream or rear region AV of the blade. It further comprises a tip S nearly parallel to the base 16 and spaced apart from the same along a radial direction with respect to the axis AX.

Both main walls of this blade are its pressure side-wall 21, which is the wall visible in FIG. 2, and its suction-side wall which is the opposite wall spaced apart from the pressure side-wall, and which is not visible in FIG. 2 because it is hidden by the pressure-side wall 21. The pressure-side and suction-side walls merge at the leading edge 17, at the trailing edge 18 and also in the region of the tip S of this blade. These walls are spaced apart from each other at the base 16 to allow cooling air to be inlet into the inner region of the blade.

The leading edge 17 has a domed shape and it is provided with a series of cooling holes 22 passing through the wall of the blade in this region. The trailing edge 18 has in turn a tapered shape, and it includes a series of cooling slits 23. These slits 23 are slits having low lengths spaced apart from each other by being located as an extension to each other, to make an assembly which runs along the end of the trailing edge 18, each slit 23 passing through the pressure-side wall 21.

In use, the fluid in which is located this blade 11 is moved with respect to the same from the leading edge 17 to the trailing edge 18 by running along the pressure-side 21 and the suction-side. The pressure-side wall 21 which is subjected to a significant warming in use, includes a series of holes 24 substantially parallel to the leading edge 17 by being located downstream from this leading edge, and another series of holes 26 substantially parallel to the trailing edge 18 by being located upstream from this trailing edge 18 and from the slits 23 it includes. The series of holes 24 and 26 thus both extend in the spanwise direction EV of the vane, which is the radial direction with respect to the axis AX.

The region of the tip S of the blade 11 has, unlike the leading edge 17 and the trailing edge 18, a certain thickness, and on the other hand it has a shape delimiting a so-called bathtub hollow portion.

More concretely, this tip S has a closing wall which connects the pressure-side and suction-side walls, this closing wall having an orientation which is generally perpendicular to the pressure-side and suction-side walls and parallel to the axis AX, which corresponds to an orientation perpendicular to the spanwise direction EV. This closing wall which is not visible in FIG. 2 is located recessed to the axis AX with respect to the free edge of the pressure-side wall and to the free edge of the suction-side wall, such that it makes up, together with these edges, a hollow open portion the opposite direction to the axis AX.

A series of further holes 27 passing through the pressure-side wall is provided along the tip S to ensure significant cooling of this vane tip which undergoes significant stresses because it is the part having the highest speed with respect to the fluid.

The series of holes 27 extends parallel to the closing wall, and the blade further includes holes non visible in FIG. 2 which pass through the closing wall to open into the so-called bathtub hollow portion which is at the vane tip.

As indicated above, such a blade is a hollow integral single piece. It is manufactured by molding a titanium or other type metal material, using a set of cores to delimit the inner ducts from its hollow portion as well as rod portions to form its through holes. The cores, rods and the same are removed once the molding operation is ended, typically with an etching process able to dissolve these elements without deteriorating the molded material. In particular, the molding assembly of FIG. 3 comprises a central core for manufacturing an inner central duct of the blade, and an integral peripheral core for manufacturing pressure-side and suction-side side cavities.

Figure 3:
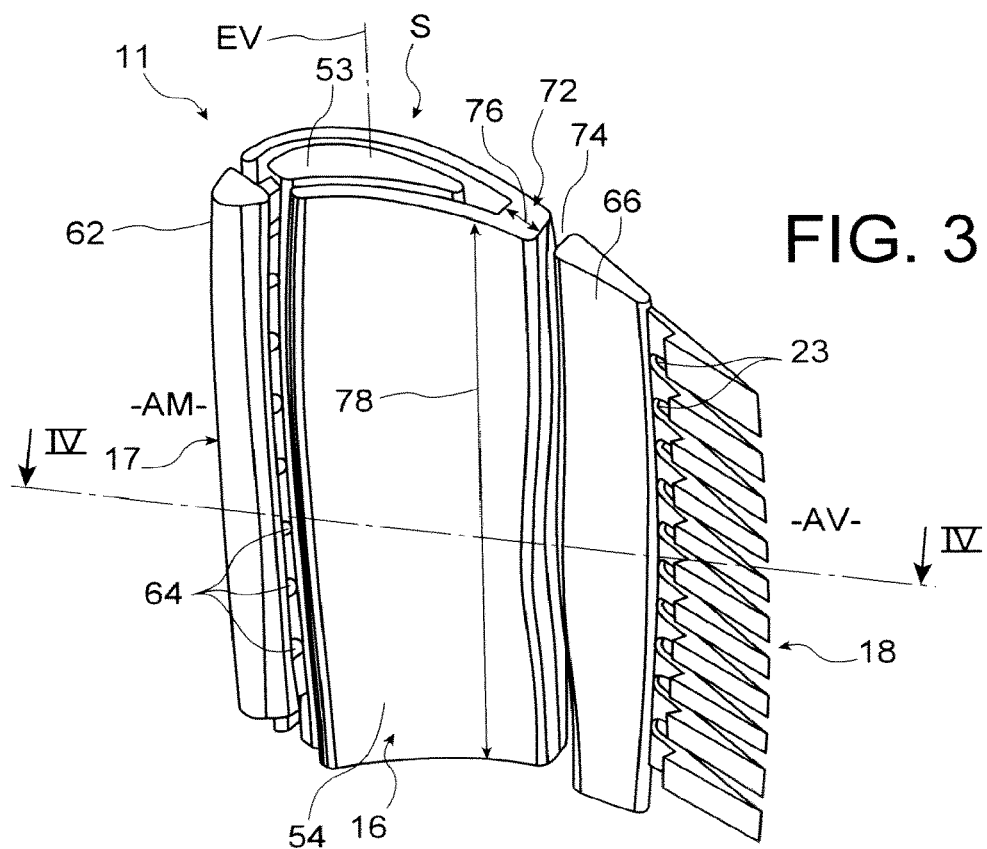
FIG. 3 is a perspective view representing the hollow inner parts of a turbine blade according to the first embodiment of the invention.
Figure 4:
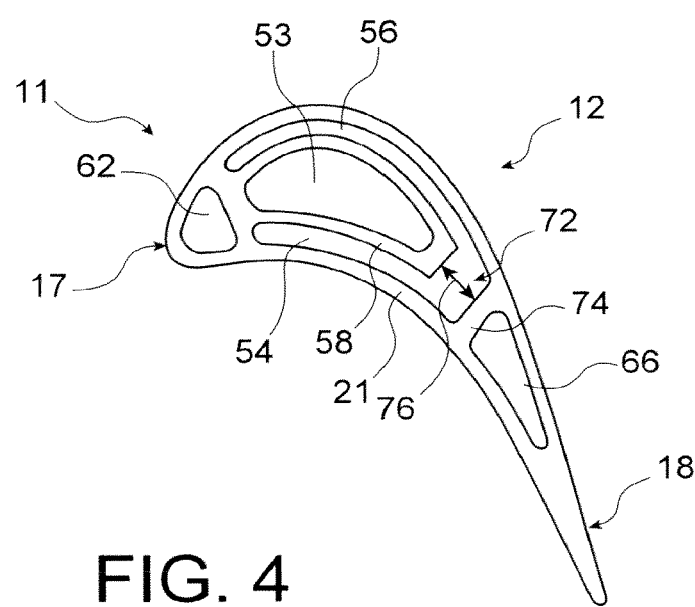
FIG. 4 is a partial schematic cross-section view of the blade according to the first embodiment in a cross-section orthogonal to the spanwise direction.

The molding assembly schematically partially represented in FIG. 3 is used for manufacturing the blade 11 represented in cross-section in FIG. 4. As such, FIG. 3 shows inner regions of the blade 11 which is represented therein by the shapes of the cores enabling this blade 11 to be manufacture. In other words, the relief shapes in FIG. 3 are representations of the hollow shapes of the blade represented in FIG. 4.

In the embodiment represented in FIG. 3 and in FIG. 4, the leading edge 17 and, to a lesser extent, the tip S are supplied with cooling air through an inner central duct 53 which extends from the root P of the blade to the tip S of this blade. The central duct 53 collects, at the root P and through the root P, cooling air to flow it into the vane 12. The air cooling the hollow region of the leading edge 17 is then discharged through the through holes 22 formed in the outer wall of the vane 12.

The blade 11 of FIG. 3 also comprises a first side cavity 54 running along the pressure-side wall, and a second side cavity 56 running along the suction-side. Both these side cavities 54, 56 thermally insulate the central duct 53 from the pressure-side and suction-side walls which are warmed by the gas flows surrounding the vane 12. The air provided to the leading edge 17 of the blade 11 and to a lesser extent to the tip S through the central duct 53 is kept fresh during its travel in this duct, by virtue of these side cavities which act as a thermal screen between the cooler central duct 53 and the pressure-side 21 and suction-side walls.

To that end, the central duct 53 is physically separate from the side cavities 54, 56, between which it extends. The central duct 53 is thereby supplied with cooling air separately from the side cavities. In order to minimize warming and head losses inside the blade 11 of FIG. 3, the central duct 53 has smooth inner surfaces.

As can be seen in FIG. 3, the first side cavity 54 has a low thickness, and it extends from the root P to the region of the tip S having a generally rectangular contour. This first side cavity 54 has a sufficient width to hide or cover the central duct 53.

In an analogous way, the second side cavity 56 also has a small thickness, and it extends from the root P to the region of the tip S. This second side cavity 56 has a generally rectangular contour, having a sufficient width to hide or cover the central conduct on the side of the suction-side.

The cooling of the blade 11 is further optimized by minimizing the head losses in the inner central duct 53 to reduce therein the heat exchanges, and by providing the contrary turbulence promoters in the side cavities 54, 56. Each side cavity 54, 56 is advantageously provided with deflectors, disturbance elements and/or bridge clamps to create turbulences in the cooling air flow.

The side cavities 54, 56 thus have an increase deficiency as a thermal screen because they absorb heat from outer walls along which they run. The air flowing in the central duct 53 is subjected to few head losses, in order to quickly flow and be warmed as little as possible. Both side cavities 54 and 56 surround the central duct 53 at least in the rear part of the central duct 53. Thereby, they wrap the inner central duct 53 over approximately three quarters of its circumference. The side cavities 54, 56 merge at the rear or downstream part of the blade 11 in a junction region 72 where they communicate with each other. The junction region 72 has, along at least one section plane orthogonal to the spanwise direction EV, an upstream open U shape. The U top has a thickness 76 substantially constant along the longitudinal direction AX of extending the vane 12 from the leading edge 17 to the trailing edge 18. The junction region 72 has an upstream open U shape and a thickness 76 approximately constant, over the entire height 78 of the junction region 72 in the spanwise direction EV.

The junction region 72 enables the central duct 53 to provide the leading edge 17 to which it supplies cooling air with even fresher air, which restricts early deteriorations of the vane 12. Both cavities 54, 56 together with the junction region 72 make up a single cavity wrapping the central duct 53 over the majority of the outer surface of the wall 58 of the inner central duct 53. The junction region 72 extends over the majority of the height 78 of this central duct 53. In practice, and as can be seen in FIG. 3, the height 78 or the length of the junction region 72 along the spanwise direction EV corresponds to the height or length of the first side cavity 54 in the spanwise direction EV. The height 78 of the junction region 72 also corresponds to the height or length of the inner central duct 53 in the spanwise direction EV.

The supply of the side cavities 54, 56 with cooling air can be separately made by two supply ducts separately opening into the blade root, the side cavities being then gathered only in the region of the vane 12. It is possible to provide a single supplying channel for both side cavities having a U shaped cross-section in a section plane transverse to the spanwise direction EV.

Downstream from the suction-side wall, there is no through holes, because in particular of the too low air pressure in this region.

The leading edge 17 of the blade is cooled by an upstream cooling ramp 62 which extends from the base 16 of the vane to the tip S. The leading edge 17 is not directly supplied by the root P but through the central duct 53, in a calibrated manner.

This calibrated supply is ensured by calibrated passageways 64 evenly spaced along the spanwise direction EV of the blade and which each connects the central duct 53 to the upstream ramp 62. Each passageway 64 has a calibrated diameter, that is chosen upon designing to obtain in the zone of the ramp 62 to which it supplies a desired air flow rate which is conditioned by the blade heat transfer in this region.

The wall of the blade 11 delimiting the leading edge 17 includes holes not represented, through which the air having flown in the upstream cooling ramp 62 passes through this wall to cool the leading edge 17. The cooling of the leading edge 17 is partly made by impacting the leading edge 17 with the cooling air from the upstream ramp 62.

The cooling slits 23 of the trailing edge, including those located in the region of the tip S, are fed with cooling air, separately from the air feed of the leading edge 17 or of the tip S. A downstream cooling ramp 66 extends from the root P, where it is directly supplied via this root P, to the region of the tip S. The downstream ramp 66 supplies cooling air to the slits 23 of the trailing edge 18. The downstream ramp 66 is separate from the junction region 72, and more generally from the side cavities 54, 56, by a transverse wall 74 substantially extending in the spanwise direction EV and in a direction orthogonal to this direction and to the longitudinal direction AX of the blade 11. Given that the central duct 53 is separate from the side cavities 54, 56, the transverse wall 74 is free of direct mechanical contact with the wall 58 delimiting the central duct 53.

In an alternative embodiment not represented in FIG. 3, and in a similar way to the supply of the leading edge 17 with cooling air, the cooling slits 23 of the trailing edge can be supplied with cooling air in a calibrated manner by the downstream ramp 66. Holes passing through the blade walls and opening into the inner side cavities forming a thermal screen can be provided to set an optimal air flow in these cavities. Each of these holes is advantageously located at a depression zone to promote air flow. Each of these holes provides that the air collected at the blade root and which is conveyed in a thermal screen forming cavity, is sucked out of the blade, after traveling in this cavity.

The invention claimed is:

1. A turbine blade of a turbomachine, the blade comprising:
    a root;
    a vane carried by the root, the vane extending in a spanwise direction from the root and until a tip, the vane comprising a leading edge and a trailing edge located downstream from the leading edge, the vane comprising a pressure-side wall and a suction-side wall which is spaced apart from the pressure-side wall, wherein the pressure-side wall and the suction-side wall each connect the leading edge to the trailing edge;
    a first inner side cavity running along the pressure-side wall and a second inner side cavity running along the suction-side wall, wherein the inner side cavities are configured to be supplied with cooling air through at least one channel opening into the root;
    at least one inner central duct extending between the inner side cavities, wherein the inner central duct is separate from the inner side cavities by a wall, wherein the inner central duct and the inner side cavities are configured to be separately supplied with cooling air from the root;
    wherein the inner side cavities communicate with each other, by merging in a junction region located downstream from the inner central duct, and wherein the junction region extends over a majority of a height of the inner central duct in the spanwise direction.

2. The blade according to claim 1, wherein the junction region extends along an entire height of at least one of the first and the second inner side cavities in the spanwise direction.

3. The blade according to claim 1, wherein the junction region has, along at least one section plane orthogonal to the spanwise direction, a U shape which is open towards upstream.

4. The blade according to claim 3, wherein the blade extends from the leading edge to the trailing edge along a longitudinal direction, and wherein a top of the U shape has a thickness which is substantially constant in the longitudinal direction.

5. The blade according to claim 1, wherein the inner central duct has smooth inner surfaces, and
    wherein the inner side cavities comprise turbulence promoters and/or deflectors, wherein the promoters and/or deflectors are configured to increase heat exchanges inside the turbine blade.

6. The blade according to claim 1, comprising at least two distinct inner side cavities that are running along the pressure-side, and/or
    at least two distinct side cavities which are running along the suction-side.

7. A turbine blade according to claim 1, wherein the turbine blade is manufactured using a molding assembly comprising at least one footprint and a set of cores for forming the inner central duct and inner side cavities.

8. A turbine for a turbomachine, the turbine comprising a turbine blade according to claim 1.

9. A turbomachine comprising a turbine according to claim 8.

\* \* \* \* \*